(12) United States Patent  
Lutzka et al.

(10) Patent No.: US 7,222,907 B2
(45) Date of Patent: May 29, 2007

(54) FLOOR RELEASE LATCH MECHANISM FOR A VEHICLE SEAT

(75) Inventors: Tavis S. Lutzka, Clawson, MI (US); Keith Brantley, Utica, MI (US)

(73) Assignee: BAE Industries, Inc., Centerline, MI (US)

( * ) Notice: Subject to any disclaimer, the term of this patent is extended or adjusted under 35 U.S.C. 154(b) by 0 days.

(21) Appl. No.: 11/013,170

(22) Filed: Dec. 15, 2004

(65) Prior Publication Data

US 2006/0125273 A1    Jun. 15, 2006

(51) Int. Cl. *B60N 2/04* (2006.01)
(52) U.S. Cl. .......... 296/65.03; 248/503.1; 297/336; 297/344.1
(58) Field of Classification Search ........... 296/65.03; 248/503.1; 297/336, 344.1
See application file for complete search history.

(56) References Cited

U.S. PATENT DOCUMENTS

| | | | |
|---|---|---|---|
| 5,224,750 A | 7/1993 | Clark et al. | 296/65.1 |
| 5,547,242 A | 8/1996 | Dukatz et al. | 296/65.1 |
| 5,904,404 A | 5/1999 | McCulloch et al. | 297/378.12 |
| 6,012,747 A * | 1/2000 | Takamura et al. | 292/216 |
| 6,039,401 A | 3/2000 | Rus | 297/378.13 |
| 6,213,525 B1 | 4/2001 | Nicola | 292/223 |
| 6,412,849 B1 | 7/2002 | Fast | 296/65.03 |
| 6,644,744 B2 | 11/2003 | Seibold | 297/335 |
| 6,945,585 B1 * | 9/2005 | Liu et al. | 296/65.03 |
| 2004/0174037 A1 | 9/2004 | Frazier et al. | 296/65.09 |
| 2004/0183327 A1 | 9/2004 | Yokoyama et al. | 296/65.03 |

* cited by examiner

*Primary Examiner*—Dennis H. Pedder
(74) *Attorney, Agent, or Firm*—Gifford, Krass, Groh, Sprinkle, Anderson & Citkowski, P.C.

(57) ABSTRACT

A release latch for use with a vehicle seat. A latch plate is rotatably secured to the seat and engages a floor mounted striker. A cam is rotatably secured to the seat and defines a shoulder biasingly seating against a support surface of the latch plate. A lever actuates the cam away from the support surface. A coil spring extends between the cam and a location of the latch plate offset from its pivot point. Forward pivoting of the seat occurs upon the shoulder separating from the support surface, the coil spring causing the latch plate to further rotate in a disengaging direction relative to the striker and upon the coil spring exceeding an over center portion relative to the pivot point of rotation of the latch plate.

20 Claims, 3 Drawing Sheets

FLOOR RELEASE LATCH MECHANISM FOR A VEHICLE SEAT

BACKGROUND OF THE INVENTION

1. Field of the Invention

The present invention relates generally to latching mechanisms for vehicle seats. More specifically, the present invention discloses a floor release latch mechanism for use with a pivoting vehicle seat and which provides both secure and anti-chuck engagement of a striker, as well as controlled release and re-engagement of the latch to and from the floor mounted striker.

2. Description of the Prior Art

The prior art is well documented with examples of latch assemblies in use with a vehicle seat. The objective in each instance is to provide for secured engagement and disengagement of the latch assembly to and from a fixed location, such as a floor mounted striker plate, and in order to permit an associated vehicle seat to be dumped/pivoted forwardly and/or removed from the vehicle.

U.S. Pat. No. 6,412,849, issued to Fast, teaches a chuck-free latch assembly including both fixed and movable members, as well as a striker fixed to one of the movable and fixed members. The latch assembly is adapted to be connectable to the other of the movable and fixed members to selectively couple the movable member to the striker. More specifically, the latch assembly includes a housing, latch and a release cam coupled to the housing, along with spring means and a release mechanism.

The housing includes a striker opening adapted to accommodate the floor secured striker. The latch is operable in a latched position when the latch assembly is in a latched mode wherein the latch is adapted to couple the striker to the housing and in an unlatched position when the latch assembly is in an unlatched mode, wherein the striker is freely movable relative to the housing. The release cam is operable in an engaged position wherein the release cam urges the latch towards its latched position and in a released position wherein the latch is operable in its unlatched position. The spring means urges the release cam toward its engaged position and the latch toward its unlatched position. Finally, the release mechanism is operable for selectively moving the release cam from its engaged position to its released position.

Rus, U.S. Pat. No. 6,039,401, discloses a latch mechanism which removably attaches a front portion of a collapsible and removable utility seat assembly to a latch rod on a vehicle floor pan. The latch mechanism includes a bracket adapted for attachment to the front portion of the utility seat assembly with a wheel attached thereto. The latch mechanism also includes a lock member rotatably connected to the bracket and adapted for engagement with the floor pan for causing rotation of the lock member with respect to the bracket to facilitate locking of the locking mechanism onto the latch rod as the utility seat assembly is collapsed.

Frazier, U.S. Patent Publication No. 2004/0174037, teaches a seat assembly which selectively engages forward and rearward strikers positioned along a floor of a motor vehicle. The seat assembly includes a seat cushion and a seat back pivotally coupled to the seat cushion. The seat assembly also includes a seat riser mounted to the seat cushion and including spaced apart rear legs. The seat riser includes rear latches operatively coupled to each of the rear legs for movement between a latched position engaged with the rear latches and an unlatched position disengaged from the rear latches. A spring assist member includes a lever portion extending between a first end fixedly secured to said rear leg and an opposite second distal end for engaging the rearward striker to assist in pivoting the seat assembly about the forward strikers as the rear latches release the rearward strikers in the unlatched position.

U.S. Pat. No. 5,224,750, issued to Clark et al., teaches a pivotal seat structure for a vehicle body and including a seat back connected to a seat cushion. The seat cushion is secured to a frame member which is pivotally mounted on the seat riser. A latch assembly is operably connected between the seat riser and the seat cushion frame member. A latch release rod is operably connected to the latch assembly. A gas spring is operably connected between the seat riser and the seat cushion frame member, the frame member, seat cushion and the seat back adapted to being pivoted forwardly off of the riser by the gas spring upon manual actuation of the latch release rod.

Finally, U.S. Pat. No. 6,213,525, issued to Nicola, discloses a lever action floor latch actuation mechanism for removing a seat to a pair of front and rear strikers located on the floor of a vehicle. A riser having a forward leg and a rearward leg supports the seat above the vehicle floor. Front and rear latches are pivotally connected to the forward and rearward legs, respectively, for releasably securing the seat to the strikers. A longitudinal link pivotally interconnects the front and rear latches and an actuation member coupled to the link simultaneously moves the latches between a latched position engaging the strikers and an unlatched position disengaging the strikers.

Each latch includes a cinch cam pivotally connecting the latch to the riser. The cinch cam has a cylindrical outer surface terminating at a flattened cam surface. A spacer plate is fixedly secured between the latch and the riser and includes a center aperture for rotatably receiving the cinch cam. The aperture forms a circular section and a tangential slot for seating a flexible plate. The cylindrical surface of the cam engages and flexes the plate when the latch is pivoted to the latched position providing an anti-rattle biasing force between the latch and striker and the flattened surface releases the flex in the plate when the latch is pivoted to the unlatched position disengaged from the striker.

SUMMARY OF THE PRESENT INVENTION

The present invention discloses a release latch mechanism for use with a vehicle seat and one in particular such a seat as is pivotally secured to a rear-positioned striker and pivotal about a forward lower edge location. The latch mechanism provides for easy disengagement of the vehicle seat and for pivoting to a forward dump position. Additionally, the construction of the latch mechanism facilitates easy re-engagement of the seat to the striker.

An inner support plate is secured to the seat proximate to the floor supported striker. An outer support plate is secured in spaced apart fashion relative to the inner support plate, and such as through the use of rivets.

A latch plate is secured in pivotal fashion between the inner and outer support plates. An arcuate configuration in the latch plate defines a recess for receiving the striker in an engaged position. An anti-chuck cam is rotatably secured to a further location associated with the support plate, a shoulder defined in the anti-chuck cam seats against a support surface of the latch plate.

A secondary cam is rotatably secured to the support plate in coaxial fashion relative to the first cam. The secondary cam exhibits a secondary shoulder positioned proximate the primary support shoulder and the latch plate support surface, the cams being biased in an engaging direction against the latch plate.

A spring extends between the anti-chuck cam and a location of the latch plate offset from a pivot point of said latch plate. Actuation of a lever secured to an exposed surface of the outer support plate, and such as which is biased in a direction towards the latch plate via a clock spring, creates a disengaging rotation of the first and second cams.

Upon the shoulders associated with the cams separating from the latch plate support surface, forward pivoting of the seat causes the latch plate to rotate relative to the striker. A specified degree of tension exerted on the spring corresponds to the latch plate further rotating to a fully disengaged position. This typically occurs upon the spring achieving an over-center position relative to the pivotal axis of the latch plate, at which point a pin end of the spring secured to the latch plate traverses along a path formed in the outer support plate.

Additional features include an arcuate slot defined in the outer plate, a pin inserting through the slot and securing to the latch plate. The spring further includes a coil spring with one end connected to the pin and an opposite end secured to an angled bracket portion associated with the anti-chuck cam.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
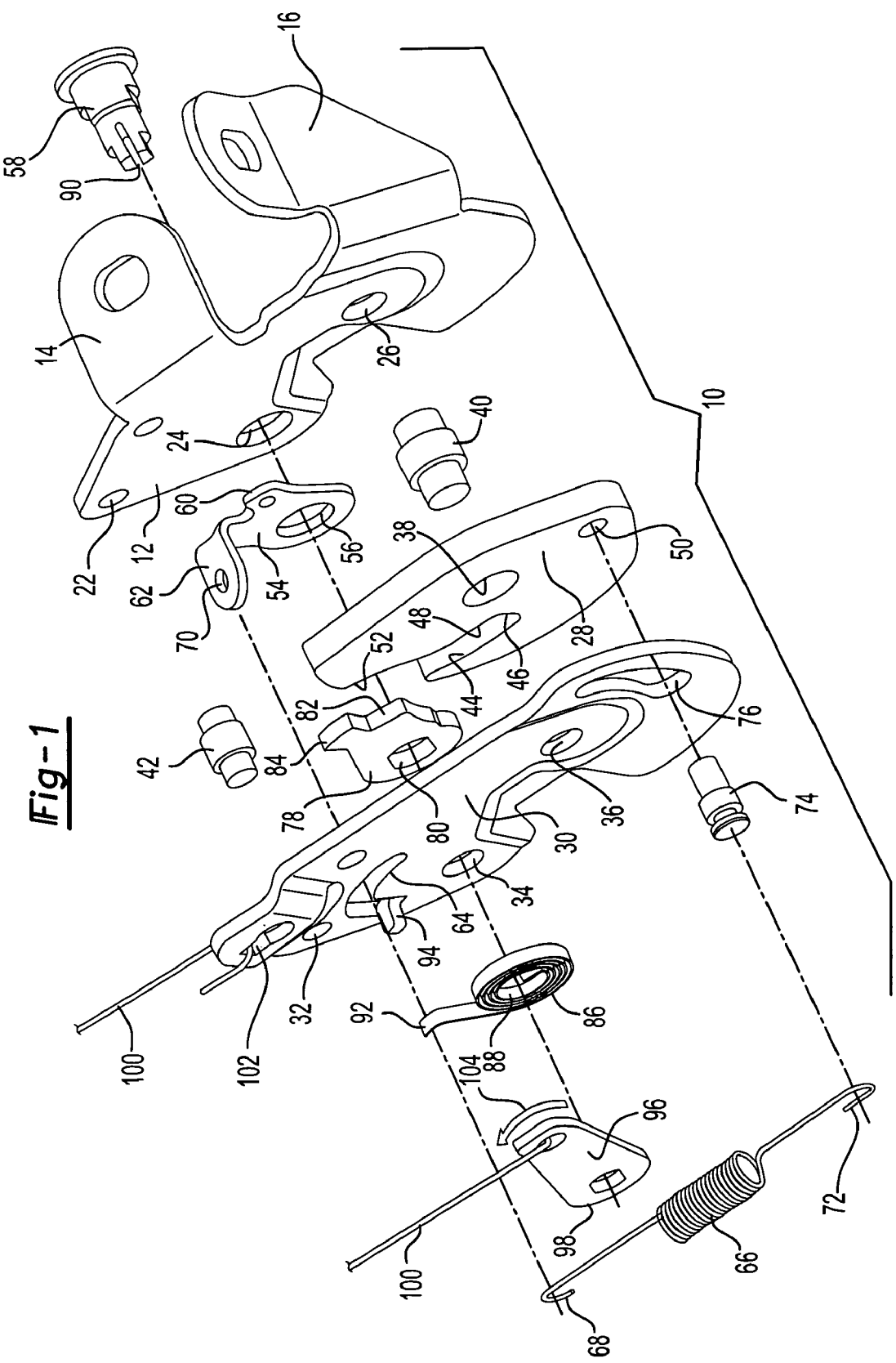
FIG. 1 is an exploded perspective view of the floor release latch mechanism according to the present invention.

Referring now to FIG. 1, in cooperation with the succeeding views of FIGS. 2–5, a release latch mechanism is illustrated at 10 according to a preferred embodiment of the present invention. As previously described, the latch mechanism provides for easy disengagement of the vehicle seat and for pivoting to a forward dump position. Additionally, the construction of the latch mechanism facilitates easy re-engagement of the seat to the striker.

The release latch mechanism 10 is secured to a side of a vehicle seat (not shown) and includes an inner support plate 12 exhibiting a typically planar support face to which is secured the various additional components of the latch mechanism. First and second mounting locations 14 and 16 are defined by angled end portions of the support plate 12 and which, with the provision of mounting bolts, secure to associated locations of the vehicle seat and typically a lowermost location of the seat frame 8. The support plate 12, in addition to the remaining components of the latch assembly, is constructed of a durable steel grade material which provides the necessary properties of strength and durability.

A floor mounted striker bar is illustrated at 18 in each of FIGS. 2–5 and cooperates with the latch assembly 10 to pivotally secure the seat to the floor (see at 20 in FIG. 5) of the vehicle interior. The inner support plate 12 further includes a plurality of apertures 22, 24 and 26 positioned at given spaced locations, the purpose of which will be subsequently explained.

A latch plate 28 is rotatably secured between the inner support plate 12 and a spaced apart outer support plate 30. For purposes of ease of illustration, the outer support plate 30 is only illustrated in FIG. 1 and is removed in the succeeding views of FIGS. 2–5. The outer support plate 30 includes an additional set of apertures 32, 34 and 36, which are in substantial alignment with the plurality of apertures 22, 24 and 26 associated with the inner support plate 12.

The latch plate 28 includes an aperture 38, positioned in alignment with the apertures 26 and 36 associated with the inner 12 and outer 30 support plates. A rivet 40 (FIG. 1) secures the latch plate 28 in pivoting fashion between the support plates 12 and 30. A further rivet 42 (also FIG. 2) is illustrated and which aligns and secures within apertures 22 and 32 in plates 12 and 30 in order to maintain the plates in a spatially arrayed fashion.

The latch plate 28 includes an arcuate extending inner configuration, see as illustrated by extending and interconnected surfaces 44, 46 and 48, and which collectively define an extended recess within the latch plate 28 for receiving the striker bar 18 in an engaged position. Additional features of the latch plate 28 include an aperture 50, located towards an end of the latch plate body and spaced from its pivot point (aperture 38), as well as a support surface 52 located proximate the striker receiving arcuate configuration.

A first cam 54 is provided and includes a central aperture 56. The cam 54 is positioned in overlapping fashion relative to the apertures 24 and 34 of the inner 12 and outer 30 plates and such that a spline shaft 58 passing therethrough rotatably affixes the cam 54 between the support plates in positioned fashion relative to the latch plate 28.

The first cam 54, also referenced as an anti-chuck cam, includes a shoulder 60 which seats, or abuts, against the support surface 52 associated with the latch plate 28 in the engaged position. As will be discussed subsequently, the circular aperture 56 of the first cam 54 is rotatably seated on an associated rounded portion of the spline shaft and, accordingly, is not fixedly, but freely, rotatable relative to the shaft 58.

An angled bracket 62 associated with the first cam 54 extends outwardly and passes through a slotted aperture 64 (see FIG. 1) defined in the outer plate 30. A coil spring 66 (see again FIG. 1) includes a first end 68 engaging through an aperture 70 defined in the angled bracket portion 62 of the anti-chuck cam 54. An opposite extending second end 72 of the spring 66 secures to a pin 74, in turn inserting through an arcuate slot 76 formed in an opposite end surface of the outer plate 30 and secured to aperture 50 defined in the latch plate 28.

A secondary cam 78 is fixedly and rotatably secured to the spline shaft 58, via configured aperture 80, between the inner 12 and outer 30 support plates. Additional features of the secondary cam 78 include a secondary shoulder 82, positioned proximate the primary support shoulder 60 of the anti-chuck cam 54 and the latch plate support surface 52, as well as an upwardly directed projection 84 also extending from the secondary shoulder 82 and in proximity to the support surface 82.

A clock spring 86 is secured upon an outer facing surface of the outer support plate 30, in position over its associated aperture 34, and such that a first inwardly curled end 88 is seated within a central aperture slot defined in the inserting end of the spline shaft 58. An opposite and exteriorly curled end 92 seats against a projection 94 associated with the outer plate 30 and in order that the clock spring 86 exerts an engaging (or clockwise) bias of the anti-chuck cam 54 and secondary cam 78 against the seating surface 52 of the latch plate.

A lever 96 is secured in overlapping fashion over the clock spring 86, and associated cams 54 and 78. An aperture 98 defined in the lever 96 seats over a projecting end of the spline shaft 58. A cable 100 is secured at a first end to the lever 96 and passes through a guide portion 102 of the outer plate 30.

Although not shown, the cable 100 (illustrated in broken fashion in the exploded view of FIG. 1) extends to a remote forward location. The cable 100 and associated lever 96 are actuated by a further mechanism positioned at a forward location of the seat and in order to disengage the latch mechanism from the striker bar 18, and as will now be described by the operation of successive views FIGS. 2–5. It is further noted that the features of the outer plate 30 and cable actuated lever 96 are removed in each of the succeeding plan views, and for purposes of ease of illustration.

Figure 2:
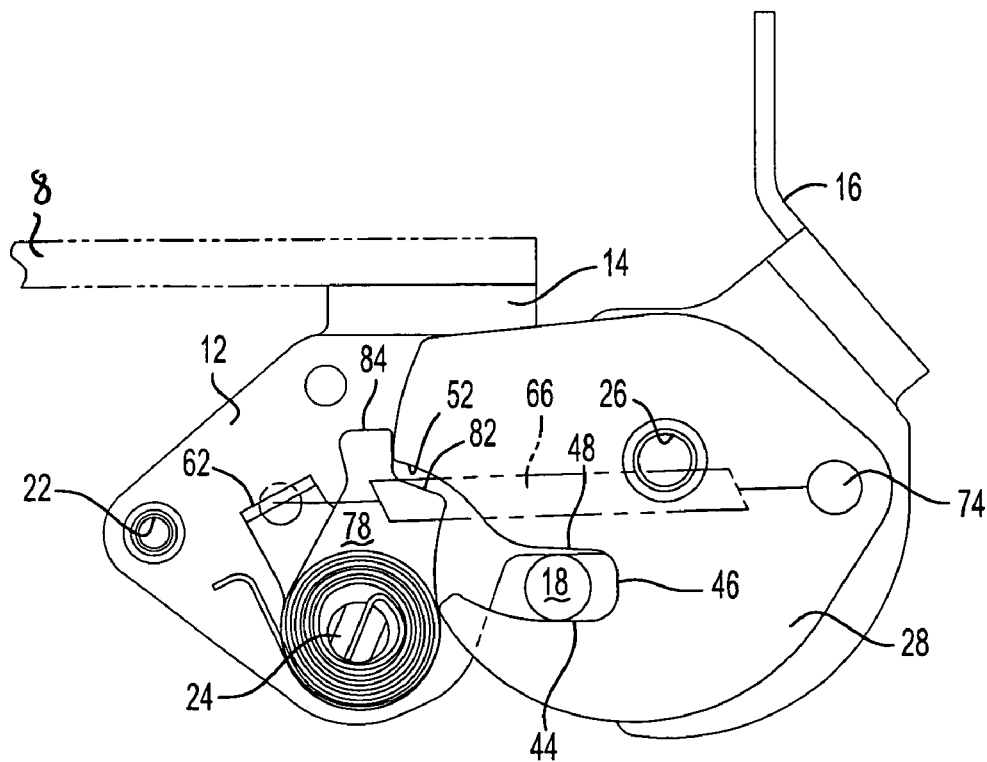
FIG. 2 is a first plan view of the floor latch mechanism in a fully engaged position relative to a floor mounted striker plate.

Referring initially to FIG. 2, a first plan view is shown of the floor latch mechanism 10 in a fully engaged position relative to a floor mounted striker plate 18. In this position, the support shoulder 60 associated with the anti-chuck cam 54 is securely biased against the support surface 52 of the latch plate 28.

The secondary cam 78 is likewise biased in an engaging position, by virtue of the action of the clock spring 86, and such that its secondary support shoulder 82 is located in close proximity to the support surface 52. In this manner, the anti-chuck cam 54 provides the initial degree of non-rattle stability to the latch 28, the secondary cam 78 providing for additional locking of the latch plate 28 in the event of any failure in the engagement of the anti-chuck cam 54.

Figure 3:
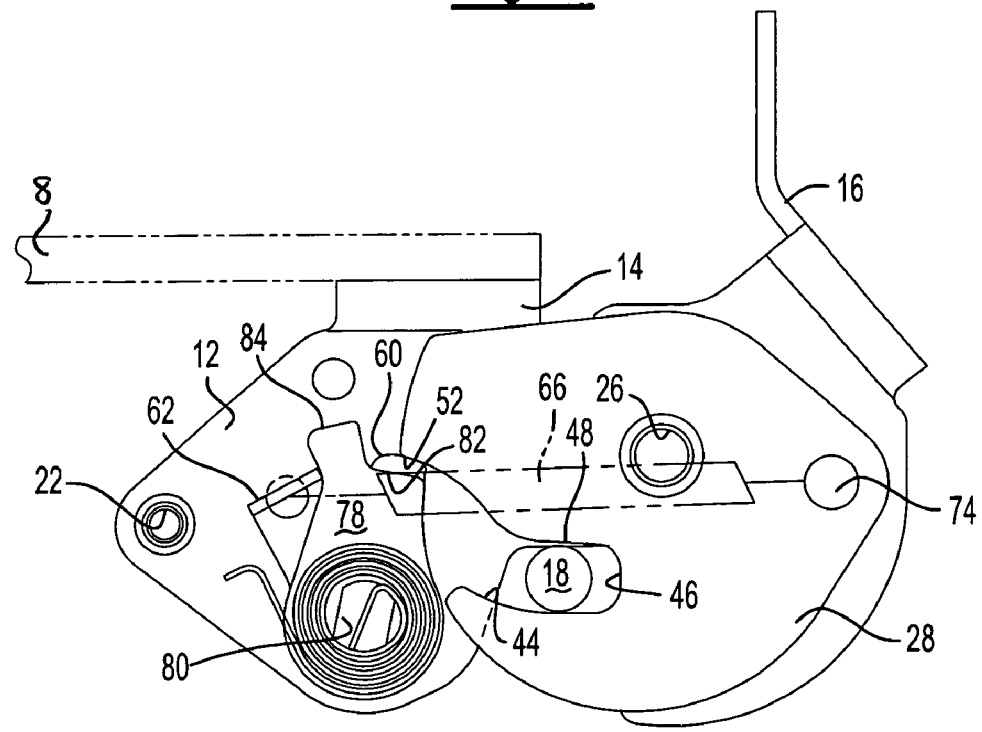
FIG. 3 is a successive and partially disengaging view of the floor latch mechanism shown in FIG. 2.

As is now referenced by FIG. 3, a successive and partially disengaging view of the floor latch mechanism shown in FIG. 2 is illustrated, and by which lever 96 is actuated in a direction indicated by arrow 104 (see as illustrated in FIG. 1). At this point, the secondary cam 78 is initially pivoted in a likewise counterclockwise (and disengaging) direction by which its associated shoulder 84 is pivoted away from the support surface 52 of the latch plate 28, while at the same time the primary support shoulder 60 of the anti-chuck cam 54 remaining in abutting engagement with the support surface 52, and further by virtue of the associated circular shaft portion of the inserted spline shaft 58 rotating relative to the circular configuration of the interior apertures 24 (inner plate 12) and 56 (anti-chuck cam 54).

Figure 4:
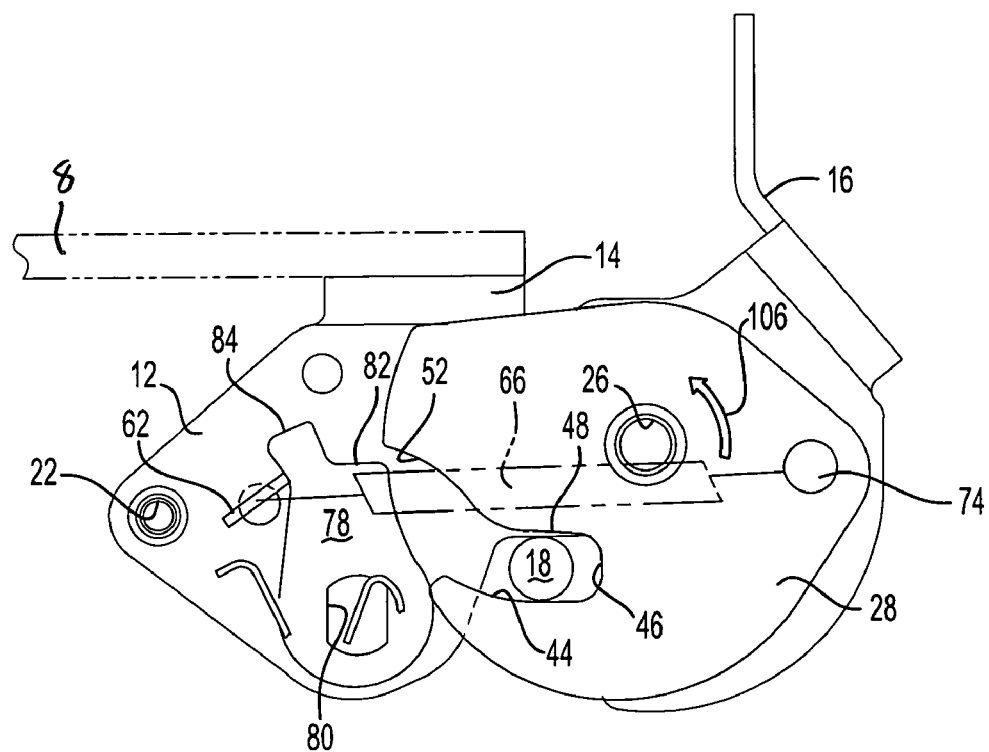
FIG. 4 is a further successive and disengaging view of the floor latch mechanism and by which a remote spring tension influences the latch, and associated seat, from disengaging contact with the striker plate.

As is now shown in FIG. 4, a further successive and disengaging view of the floor latch mechanism is illustrated by continued actuation of the secondary cam 78 (in the direction of arrow 104 and caused by associated pivoting of the lever 96). At this point, the upper projection 84 of the secondary cam 78 contacts the angled bracket portion 62 of the anti-chuck cam 54, the continued actuation of both cams resulting in an increase in the tension of the spring 66 and as the shoulder 60 of the anti-chuck cam 54 unseats from the support surface 52 of the latch plate 28.

At this point, the latch plate 28 is free to rotate about its pivotal mounting point 40 and such rotation, in a counter-clockwise direction 106 (see again FIG. 4), is caused by a forward pivoting bias being exerted upon the latch assembly 10, this typically resulting from the associated vehicle seat pivoting about a forward lower edge (again not shown). As is also known, the seat may include a spring-bias to influence the latch assembly to a disengaging position. Alternatively, the seat may be manually tilted to the forward dump position.

Figure 5:
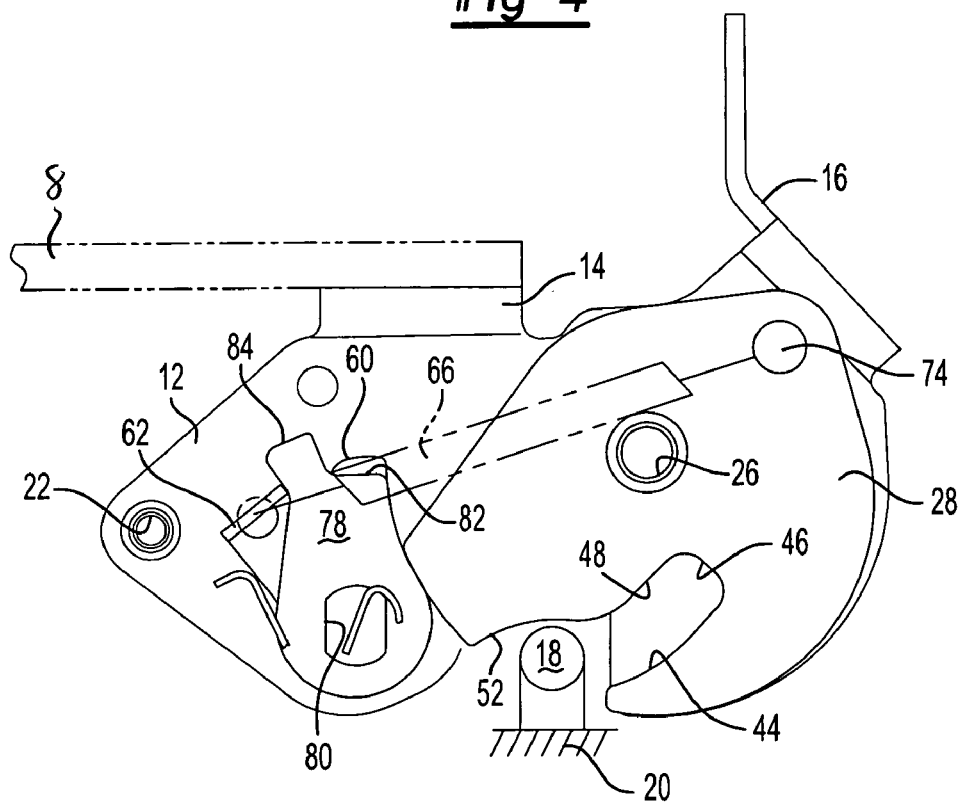
FIG. 5 is a fully disengaged view of the floor latch mechanism.

Referring finally to FIG. 5, a fully disengaged view of the floor latch mechanism is illustrated and by which the disengaging force of the striker bar 18, acting on the latch plate 28, causes the plate 28 to continue to rotate in the direction of the arrow 106 (FIG. 4). As the latch plate 28 continues to rotate, the tension exerted on the spring 66 increases to the point in which the pin mounting location 74 of the spring end 72 (FIG. 1) passes over center of the pivotal mounting location (see pivot pin 40).

Upon passing the over center position, a reverse compression force on the spring 66 causes the latch plate 28 to be complete its pivot to a fully open (disengaged) position and by which the striker bar 18 is permitted to unseat from the arcuate configuration associated with the latch plate 28. The seat is then permitted to freely pivot to its forward dump position, and with the latch plate 28 remaining in a fully opened position.

When it is desired to re-engage the latch mechanism 10 and associated seat, with the striker bar 18, the seat is forcibly pivoted rearwardly, until such time as the striker contacts the inner contour of the arcuate configuration. At this point, a reverse of the illustrations of FIGS. 2–5 occurs and by which the latch plate 28 is re-engaged in a clockwise direction. The spring 66 passes over center once again to the position of FIG. 4, and results in the anti-chuck cam 54 and secondary cam 78 being successively drawn back into engagement with the support surface 52 of the latch plate 28.

Having described our invention, other and additional preferred embodiments will become apparent to those skilled in the art to which it pertains, without deviating from the scope of the appended claims.

We claim:

1. A release latch mechanism for use with a seat and engaged to a striker associated with a vehicle floor, said latch mechanism comprising:

a support plate secured to a lowermost location of a seat frame proximate to the floor supported striker;

a latch plate rotatably secured to said support plate, an arcuate configuration defined in said latch plate defining a recess for receiving the striker in an engaged position;

a first cam rotatably secured to a further location associated with said support plate, said first cam having a shoulder seating against a support surface of said latch plate;

a second cam rotatably secured to said support plate in coaxial fashion relative to said first cam; and a spring extending between said first cam and a location of said latch plate offset from said rotatable securement to said support plate;

said second cam being actuated to rotate in a direction away from said support surface, continued rotation causing said first cam to rotate in unison and, upon said shoulder separating from said support surface, forward pivoting of the seat and latch plate causing said latch plate to rotate relative to the striker, a specified degree of tension exerted by said spring resulting from displacement of said latch plate influencing said latch plate to further rotate to a fully disengaged position.

2. The release latch mechanism as described in claim 1, said second cam exhibiting a secondary shoulder positioned proximate said primary support shoulder and said support surface.

3. The release latch mechanism as described in claim 1, said support plate comprising an inner plate, an outer plate pivotally supporting said latch plate and said first and second cam members in saudwiching fashion relative said inner plate.

4. The release latch mechanism as described in claim 3, further comprising a clock spring secured upon said outer plate and influencing said second cam in engaging fashion against said seating surface of said latch plate.

5. The release latch mechanism as described in claim 3, further comprising an arcuate slot defined in said outer plate, a pin inserting through said slot and securing to said latch plate, said spring further comprising a coil spring with an end connected to said pin.

6. The release latch mechanism as described in claim 4, further comprising a cable actuated lever secured in overlapping fashion relative to said cams and said clock spring, pivoting of said lever overcoming a bias associated with said clock spring and creating disengaging rotation of said first and second cams.

7. The release latch mechanism as described in claim 6, further comprising a spline shaft for coaxially mounting said first and second cams, said clock spring and said lever relative to said inner and outer plates.

8. The release latch mechanism as described in claim 3, further comprising a rivet for rotatably securing said latch plate between said inner and outer plates.

9. A release latch for use with a vehicle seat, comprising:
a latch plate rotatably secured to a lowermost location of the seat and exhibiting a recess to engage a floor mounted striker;
a first cam rotatably secured to the seat and defining a primary support shoulder biasing against a support surface associated with said latch plate;
a lever actuating said cam in an unseating direction away from said support surface; and
a coil spring extending between said first cam and a location of said latch plate offset from its pivot point of rotation;
said primary support shoulder separating from said support surface prior to the seat being forwardly pivoted, initial rotation of said latch plate influencing said coil spring causing said latch plate to further rotate in a disengaging direction relative to the striker, and upon said coil spring exceeding an over center position relative to said pivot point of rotation of said latch plate.

10. The release latch as described in claim 9, further comprising a secondary cam secured in coaxial fashion relative to said first cam.

11. The release latch as described in claim 10, said second cam exhibiting a secondary shoulder positioned proximate said primary support shoulder and said support surface.

12. The release latch as described in claim 10, further comprising an inner plate and an outer plate sandwiching said first and second cams and said latch plate therebetween, said lever securing upon an exposed face of said outer plate.

13. The release latch as described in claim 12, further comprising an arcuate slot defined in said outer plate, a pin inserting through said slot and securing to said latch plate, said spring further comprising a coil spring with an end connected to said pin.

14. A release latch assembly for use with a vehicle seat, comprising:
an inner support plate secured to a lowermost location of a seat frame proximate to a floor supported striker, an outer support plate secured in spaced apart fashion relative to said inner support plate;
a latch plate secured in pivotal fashion between said inner and outer support plates, an arcuate configuration defined in said latch plate defining a recess for receiving the striker in an engaged position;
a first anti-chuck cam rotatably secured to a further location between said support plates, a primary support shoulder defined in said first cam seating against a support surface of said latch plate;
a secondary cam rotatably secured between said support plates in coaxial fashion relative to said first cam, said secondary cam exhibiting a secondary shoulder positioned proximate said primary support shoulder and said support surface, said second cam biasing in an engaging direction against said latch plate;
a spring extending between said first cam and a location of said latch plate offset from a pivot point of said latch plate; and
actuation of a lever secured to an exposed surface of said outer support plate creating a disengaging rotation of said first and second cams and, upon said primary support shoulder of said first cam separating from said latch plate support surface and said secondary shoulder rotating away from an underlying position relative to said support surface, forward pivoting of the seat causing said latch plate to rotate relative to the striker, a specified degree of tension exerted on said spring corresponding to said latch plate further rotating to a fully disengaged position.

15. The release latch assembly as described in claim 14, further comprising a clock spring secured upon said outer plate, a spline shaft extending through said inner and outer plates and coaxially disposed anti-chuck and secondary cams, an end of said spline shaft engaging a central location associated with said clock spring and influencing said secondary cam and, by contact, said anti-chuck cam in engaging fashion against said latch plate.

16. The release latch assembly as described in claim 14, further comprising an arcuate slot defined in said outer plate, a pin inserting through said slot and securing to said latch plate, said spring further comprising a coil spring with an end connected to said pin.

17. The release latch assembly as described in claim 14, further comprising a clock spring biasingly influencing said lever and said secondary cam, pivoting of said lever overcoming said bias and creating disengagement rotation of said first and second cams.

18. The release latch assembly as described in claim 17, further comprising a spline shaft for coaxially mounting said first and second cams, said clock spring and said lever relative to said inner and outer plates.

19. The release latch assembly as described in claim 14, further comprising a rivet for securing said latch plate in pivotal fashion between said inner and outer plates.

20. The release latch assembly as described in claim 14, said anti-chuck cam further comprising an angled bracket portion to which an extending end of said coil spring is secured.

* * * * *